(12) United States Patent
Ashrafi et al.

(10) Patent No.: US 12,299,073 B2
(45) Date of Patent: May 13, 2025

(54) SYSTEM AND METHOD TO CAPTURE DATA TRANSITIONS AND SELECT OPTIMAL DATA INTENSIVE MACHINE LEARNING MODEL

(71) Applicant: International Business Machines Corporation, Armonk, NY (US)

(72) Inventors: Noor Mohammed Ashrafi, Bangalore (IN); Mohan Nagraj Dani, Bangalore (IN); Balaji Rishi Sundarajan, Hyderabad (IN); Sharath C Athrey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 17/198,963

(22) Filed: Mar. 11, 2021

(65) Prior Publication Data
US 2022/0292309 A1    Sep. 15, 2022

(51) Int. Cl.
G06N 5/01       (2023.01)
G06F 18/214     (2023.01)
G06F 18/23      (2023.01)
G06F 18/231     (2023.01)
G06N 20/00      (2019.01)

(52) U.S. Cl.
CPC ........ *G06F 18/2148* (2023.01); *G06F 18/231* (2023.01); *G06N 5/01* (2023.01); *G06N 20/00* (2019.01)

(58) Field of Classification Search
None
See application file for complete search history.

(56) References Cited

U.S. PATENT DOCUMENTS 9,348,861 B2    5/2016   Krein et al.
9,697,240 B2    7/2017   Friedlander et al.
(Continued)

OTHER PUBLICATIONS

Meurice, Loup, and Anthony Cleve. "Dahlia: A visual analyzer of database schema evolution." 2014 Software Evolution Week—IEEE Conference on Software Maintenance, Reengineering, and Reverse Engineering (CSMR-WCRE). IEEE, 2014. (Year: 2014).*

(Continued)

*Primary Examiner* — Hal Schnee
(74) *Attorney, Agent, or Firm* — Scully, Scott, Murphy & Presser, P.C.

(57) ABSTRACT

A computer-implemented system, method and computer program product for capturing data transitions and selecting machine learning models that includes: providing a machine learning model trained with a previous training data set; receiving a new data set; comparing the new data set to the previous data set; and identifying and recording new, removed, and/or changed set of attributes added to the new data set. Future possible data state transitions are generated based upon the present data state; and an implication tree is generated based upon the present data state, the pass-through data states, and the future possible data state transitions. Performance metrics of each node in the implication tree are clustered, the nodes demonstrating a high variance optionally are discarded; reachability scores for remaining nodes are calculated; and a node (representing a machine learning model to run) is selected based upon its reachability score.

20 Claims, 9 Drawing Sheets

(56) References Cited

U.S. PATENT DOCUMENTS

| | | | |
|---|---|---|---|
| 9,875,275 | B2 | 1/2018 | Krishna et al. |
| 10,423,641 | B2 | 9/2019 | Bonnell et al. |
| 10,503,750 | B2 | 12/2019 | Curtis |
| 10,635,660 | B2 | 4/2020 | Mishra |
| 2018/0075006 | A1* | 3/2018 | Har-Tal ............... G06F 40/197 |
| 2018/0081924 | A1 | 3/2018 | Johnston |
| 2019/0238431 | A1 | 8/2019 | Dickey |
| 2020/0004749 | A1 | 1/2020 | Slezak et al. |
| 2020/0107072 | A1 | 4/2020 | Lomada et al. |
| 2020/0174989 | A1 | 6/2020 | Koza et al. |
| 2020/0241977 | A1 | 7/2020 | Marthala et al. |
| 2021/0366037 | A1* | 11/2021 | Walters ............... G06F 16/2365 |
| 2022/0236965 | A1* | 7/2022 | Rahill-Marier ......... G06F 9/451 |
| 2023/0334031 | A1* | 10/2023 | Acker ................... G06F 16/219 |

OTHER PUBLICATIONS

Montplaisir-Gonçalves, Alexandre, et al. "State history tree: an incremental disk-based data structure for very large interval data." 2013 International Conference on Social Computing. IEEE, 2013. (Year: 2013).*

Schwartz, Eric M., Eric T. Bradlow, and Peter S. Fader. "Model selection using database characteristics: Developing a classification tree for longitudinal incidence data." Marketing Science 33.2 (2014): 188-205. (Year: 2014).*

Song, J., et al., "C2Metadata: Automating The Capture Of Data Transformation From Statstical Scripts In Data Documentation", SIGMOD'19 ACM Inter. Conf. On, Jun. 30-Jul. 5, 2019, pp. 2005-2008, Amsterdam, Netherlands.

Omitola, T., et al., "Capturing Interactive Data Transformation Operations Using Provenance Workflows", ESWC 2012 Satellite Events, Apr. 12, 2015, pp. 29-42, LNCS 7540.

Barkaway, D., et al., "Change Data Capture And The Benefits To The Modern Enterprise Data Warehouse", SAS Institute Incorporation, Sep. 24, 2008, pp. 1-12.

Egyed, A., et al., "Data And State Synchronicity Problems While Integrating COTS Software Into Systems", Proceedings of the 4th International Workshop on Adoption-Centric Software Engineering, co-located with ICSE May 25, 2004, 2004, pp. 1-6.

Wu, B., et al., "Learning Data Thranformation Rules Through Examples: Preliminary Results", IIWEB'12 9th ACM International Conference On, May 20, 2012, pp. 1-6.

* cited by examiner

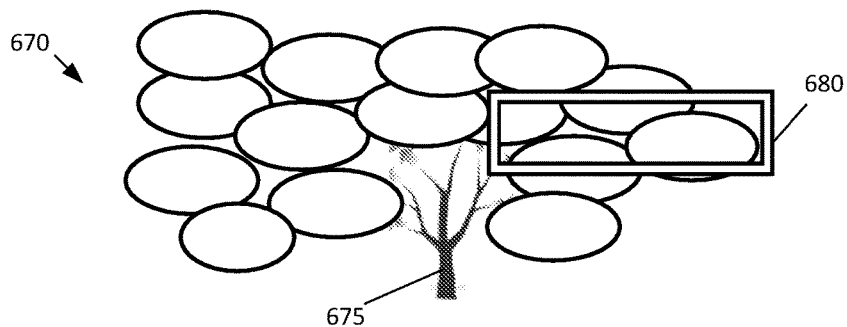

FIG. 6

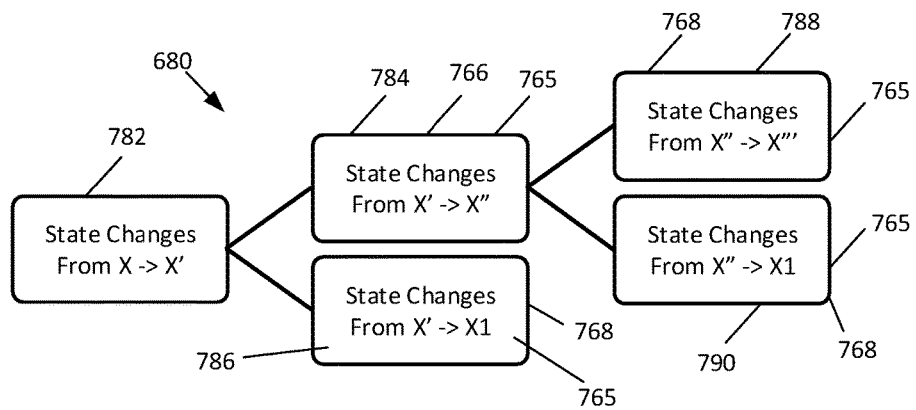

FIG. 7

| ID | Date | Customer Name | Product | Present State | Pass Through State(s) | Implication(s) |
|---|---|---|---|---|---|---|
| 1 | 1/5/ 2021 | Customer A | XYZ | Foreclosure - Bankruptcy | Regular    A<br>Delinquent  b<br>Default    c<br>Notice of Foreclosure d | Regular    A<br>Delinquent  b<br>Default    c<br>Notice of Foreclosure  d<br>Foreclosure  e<br>Bankruptcy  f1, f2<br>Forbearance  g<br>Reinstatement  h<br>Short sale  i<br>Liens  j<br>Payoff  k |

FIG. 8

SYSTEM AND METHOD TO CAPTURE DATA TRANSITIONS AND SELECT OPTIMAL DATA INTENSIVE MACHINE LEARNING MODEL

FIELD

The present application relates generally to information handling and/or data processing and analytics, and more particularly to capturing data transitions and transformations in data intensive machine learning (ML) models, and in an aspect selecting an optimal machine learning model.

BACKGROUND

Generally in fraud detection and/or anti-money laundering (AML) cases there are numerous and different parameters and metrics analyzed to detect fraud, typically in a large data set, that are analyzed and used to build machine learning (ML) models. For example, there could be forty (40) to four hundred (400) parameters and metrics analyzed to detect fraud and build ML models. Similarly, in business risk and/or claim processing, there are numerous and different parameters and metrics used to detect risky transactions, typically in large data sets, that are analyzed and used to build machine learning (ML) models. For example, there could be hundreds of parameters and metrics analyzed to detect risk and build ML models associated with a loan or mortgage transaction. These parameters and metrics when passed onto any feature generation process and anomaly detection ML models typically results in hundreds and thousands of transformation groupings that are used to produce or output a result. It is typically not possible to measure lineage, traceability, and back tracing of data to explain the result. It is also difficult to explain what, how, and when each transformation impacts the result.

It would be useful and beneficial to have a system and/or method to trace and detect the data changes, transitions, and/or transformations in large data sets in data intensive ML models in order to capture data transformations for data governance in business risk and/or fraud detection cases. It would be advantageous and beneficial to be able to measure and figure out the impact of data change on feature selection and effectiveness of ML model, and use that information to select an optimal ML model, especially in large data sets where data intensive ML models are utilized.

SUMMARY

The summary of the disclosure is given to aid understanding of, and not with an intent to limit the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and their method of operation to achieve different effects. In this regard it will be appreciated that the disclosure presents and describes one or more inventions, and in aspects includes numerous inventions as defined by the claims.

A system, method and/or computer program product is disclosed for capturing data transitions in machine learning models that includes in one or more embodiments: provide a machine learning model trained with one or more electronic training data sets, the one or more electronic training data sets comprising a previous electronic training data set; receive a new electronic data set; compare the new electronic data set to the previous electronic training data set; identify a new set of attributes added to the new electronic data set in comparison to the previous electronic training data set; identify a removed set of attributes deleted from the new electronic data set in comparison to the previous electronic training data set; identify a changed set of attributes in the new electronic data set that were modified in comparison to the previous electronic training data set; and record at least one of the group of attributes consisting of: the new set of attributes, the removed set of attributes, the changed set of attributes, and combinations thereof, as data state transitions, including a present data state and all one or more previous pass-through data state transitions. The system, method, and/or computer program product optionally further includes identifying a significant attribute set that contributes to a data state transition in the new electronic data set. The significant attribute set in an aspect includes at least one of the group consisting of: the new set of attributes, the removed set of attributes, the changed set of attributes, and combinations thereof. In an embodiment, the new electronic data set comprises a structured table of attributes. In an embodiment, the system and/or method includes a Model Training Component that comprises the machine learning model, receives the new electronic data set, compares the new electronic data set to the previous electronic training data set, identifies the new set of attributes, the removed set of attributes, and the changed set of attributes, and records the at least one group of attributes as data state transitions.

The system, method and/or computer program product in an embodiment further includes generating future possible data state transitions based upon the present data state. In one or more embodiments, the system, method and/or computer program product further includes generating an implication tree based upon the present data state, the pass-through data states, and the future possible data state transitions, wherein the implication tree comprises nodes that represent the future possible data state transitions and the nodes further represent machine learning models. In an aspect, the system, method, and/or computer program product further includes calculating performance metrics for each node in the implication tree. In one or more embodiments, the system, method, and/or computer program product further include clustering the performance metrics of each node in the implication tree and disregarding the nodes demonstrating a high variance while retaining the remaining nodes. Nodes demonstrating a high variance in an embodiment have a deviation from the clustering of other nodes of greater than ten percent (10%). The system, method, and/or computer program product in an embodiment further includes calculating reachability scores for each remaining node, wherein the reachability is a function of the number of hops to the respective remaining node, the performance metrics of the parent branch of the respective remaining node, and the set of data state changes to reach the respective remaining node; and selecting the node based upon the reachability score.

In an embodiment, a non-transitory computer readable medium is disclosed that includes instructions that, when executed by at least one hardware processor, configure the at least one hardware processor to perform the operations specified above. A computer-implemented system to capture data transitions in machine learning models is also disclosed that includes a memory storage device storing program instructions; and a hardware processor coupled to said memory storage device, the hardware processor, in response to executing said program instructions, is configured to perform the operations specified above. In an aspect, the system, method, and/or computer program product generates future possible data state transitions based upon the present data state; and generates an implication tree based upon the present data state, the pass-through data states, and the future possible data state transitions, wherein the implication tree comprises nodes that represent the future possible data state transitions and the nodes further represent machine learning models. In a further aspect, the system, method, and/or computer program product clusters the performance metrics of each node in the implication tree, and disregard the nodes demonstrating a high variance while retaining the remaining nodes; calculates reachability scores for each remaining node, wherein the reachability is a function of the number of hops to the respective remaining node, the performance metrics of the parent branch of the respective remaining node, and the set of data state changes to reach the respective remaining node; and selects a node based upon the reachability score.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system and/or method to capture data transformation in machine learning (ML) models, and in an aspect select an optimal ML model, for example in large data environments, will be better understood when read in conjunction with the figures provided. Embodiments are provided in the figures for the purpose of illustrating aspects, features, and/or various embodiments of the systems and methods, but the claims should not be limited to the precise arrangement, structures, features, aspects, systems, modules, functional units, assemblies, subassemblies, circuitry, embodiments, methods, processes, techniques, instructions, and/or devices shown, and the arrangements, structures, features, aspects, systems, modules, functional units, assemblies, subassemblies, circuitry, embodiments, methods, processes, techniques, instructions, and devices shown may be used singularly or in combination with other arrangements, structures, assemblies, subassemblies, systems, modules, functional units, features, aspects, circuitry, embodiments, methods, techniques, processes, instructions, and/or devices.

FIG. 6 diagrammatically illustrates in accordance with an example of the present disclosure an example implication tree;

FIG. 7 diagrammatically illustrates in accordance with an example of the present disclosure, an implication branch of an implication tree representing data state transitions and implication tree nodes and/or leaves representing machine learning models;

FIG. 8 diagrammatically illustrates data attributes of a data record undergoing a data state transition between a new electronic data set and a previous electronic data set wherein implications representing possible future states are generated;

DETAILED DESCRIPTION

The following description is made for illustrating the general principles of the invention and is not meant to limit the inventive concepts claimed herein. In the following detailed description, numerous details are set forth in order to provide an understanding of the system, method, and/or techniques for capturing data transformations, changes, and/or transitions in machine learning (ML) models, and in an aspect optimizing selection of ML models for use, typically in data intensive environments. It will be understood, however, by those skilled in the art that different and numerous embodiments of the system and its method of operation may be practiced without the specific details, and the claims and disclosure should not be limited to the arrangements, structures, systems, assemblies, subassemblies, modules, functional units, circuitry, embodiments, features, aspects, processes, methods, techniques, instructions, and/or details specifically described and shown herein. Further, particular features, aspects, arrangements, structures, systems, assemblies, subassemblies, modules, functional units, circuitry, embodiments, methods, processes, techniques, instructions, details, etc. described herein can be used in combination with other described features, aspects, arrangements, structures, systems, assemblies, subassemblies, modules, functional units, circuitry, embodiments, techniques, methods, processes, instructions, details, etc. in each of the various possible combinations and permutations.

The following discussion omits or only briefly describes conventional features of information processing systems and data networks, including electronic data analytics programs or electronic risk assessment tools configured and adapted for example to calculate and detect business risk, problematic transactions or claims, and/or suspicious activity in connection with, for example, financial and/or insurance claim transactions, which should be apparent to those skilled in the art. It is assumed that those skilled in the art are familiar with data processing including large scale data processing (also referred to as information/data processing systems) and their operation, and application of data analytics, including data analytics systems and processes using, for example, machine learning (ML) models. It may be noted that a numbered element is numbered according to the figure in which the element is introduced, and is typically referred to by that number throughout succeeding figures.

Figure 1:
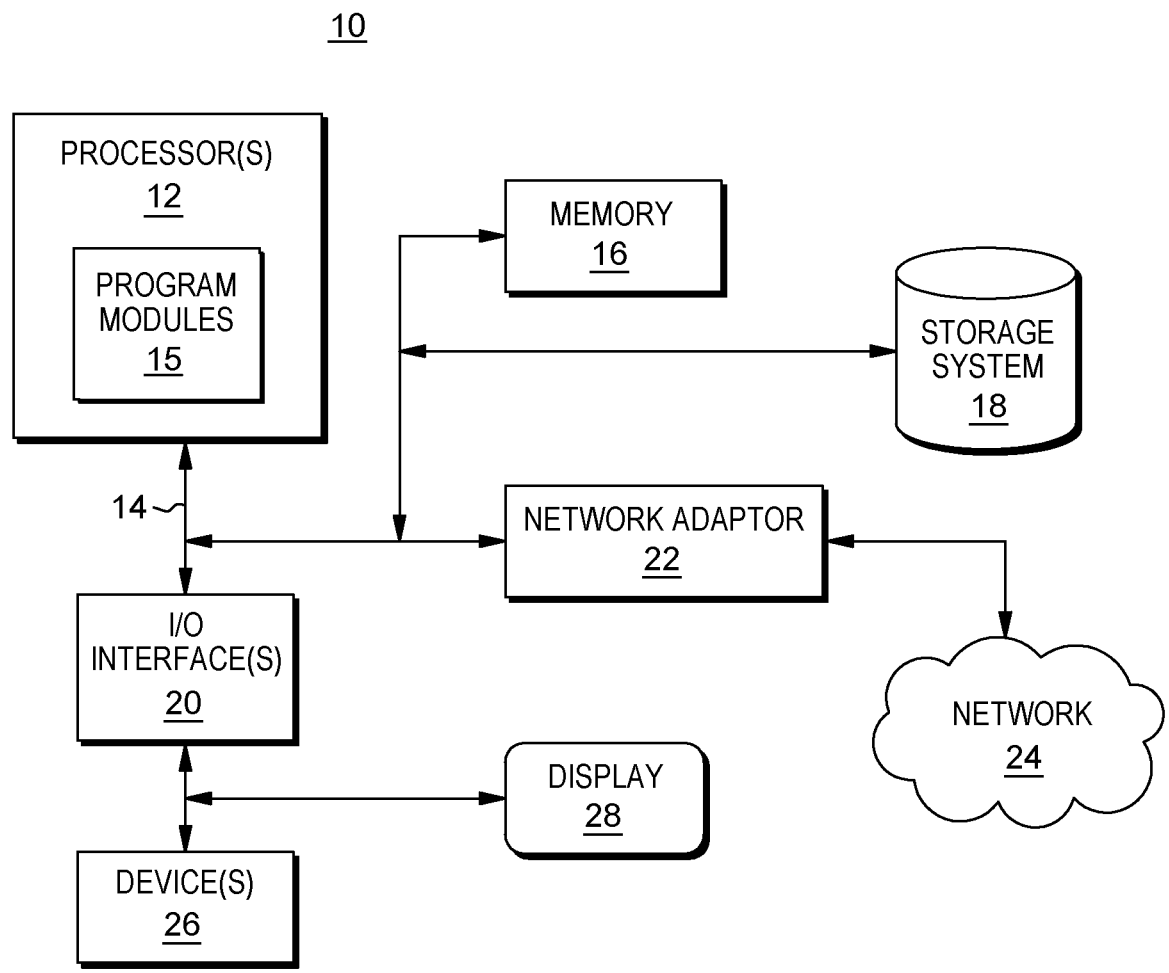
FIG. 1 illustrates an exemplary computer system in accordance with the present disclosure to capture data transformations in machine learning (ML) models and in an aspect optimize and/or select the optimal machine learning (ML) model.

FIG. 1 illustrates an example computing system 10 in accordance with the present invention. It is to be understood that the computer system depicted is only one example of a suitable electronic data processing and/or data analytics system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, tablets, smart phones, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system 10 may be described in the general context of computer system executable instructions, embodied as program modules or software programs stored in memory 16, being executed by the computer system. Generally, program modules may include routines, programs, objects, components, logic, data structures, and so on that perform particular tasks and/or implement particular input data and/or data types in accordance with the present invention.

The components of the computer system 10 may include, but are not limited to, one or more processors or processing units 12, a memory 16, and a bus 14 that operably couples various system components, including memory 16 to processor 12. In some embodiments, the processor 12 may execute one or more program modules 15 that are loaded from memory 16, where the program module(s) embody software (program instructions) that cause the processor to perform one or more method embodiments of the present invention. In some embodiments, program module 15, e.g., software programs, may be programmed into the circuits of the processor 12, loaded from memory 16, storage device 18, network 24 and/or combinations thereof. It is generally appreciated that processor 12 contains circuits including integrated circuits to perform operations of the processor 12.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 10 may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system 10 may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system 10 can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 2:
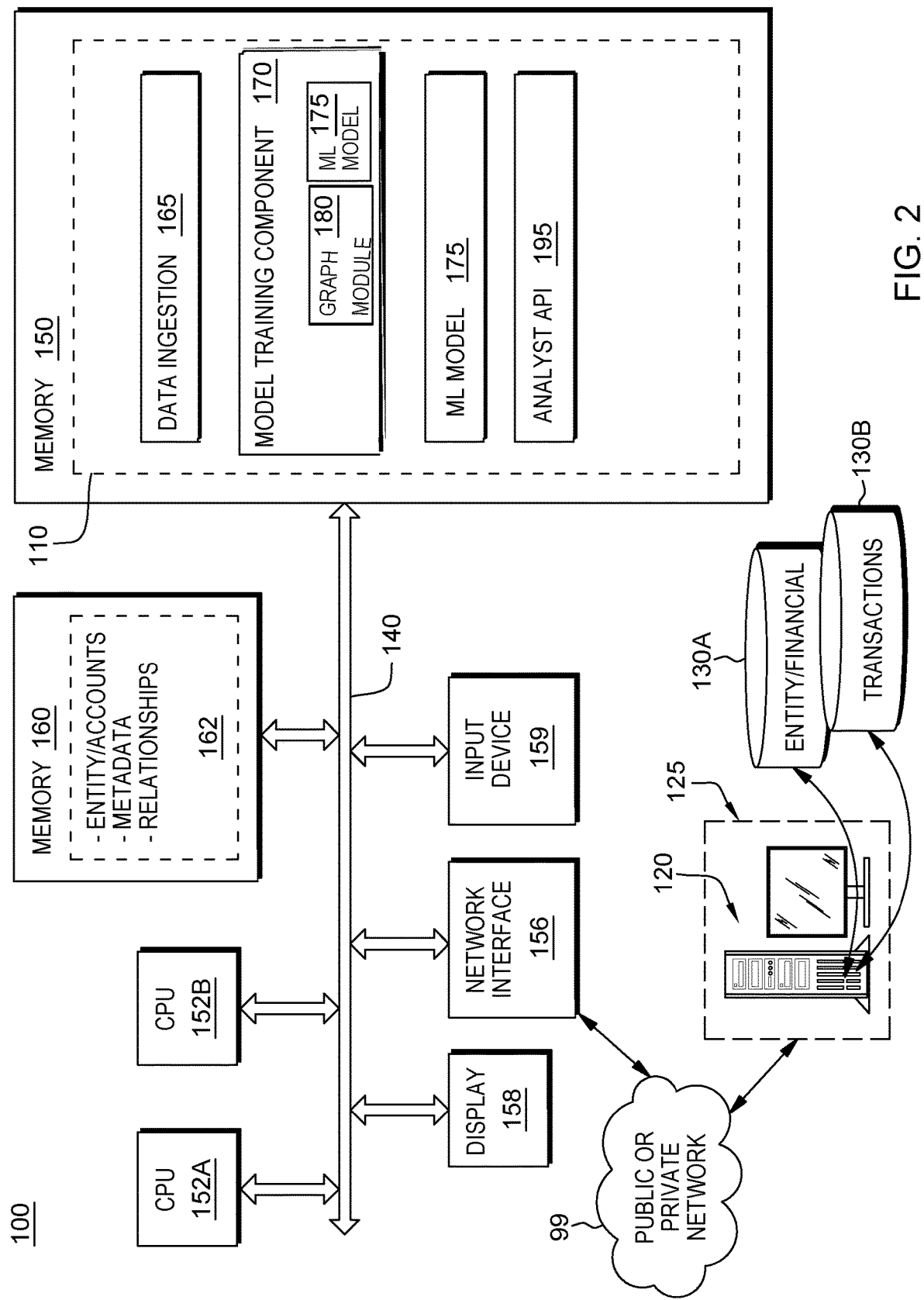
FIG. 2 schematically shows an exemplary computer system/computing device which is applicable to implement one or more embodiments of the present disclosure to capture data transformations in machine learning (ML) models and in an aspect optimize and/or select the optimal machine learning (ML) model.

FIG. 2 illustrates a computer system 100 configured and programmed for use as an electronic risk assessment tool to implement methods to more accurately detect risky transactions in the domain of financial services, insurance claims processing, and related industries, e.g., loan/mortgage processing, insurance claim fraud, and/or money laundering fraud detection. In embodiments, such a system tool 100 may be employed by or for a bank or insurance company. According to an embodiment, risk assessment tool 100 is a computer system, a computing device, a mobile device, or a server configured to run risk assessment software applications and models. In some aspects, computing device 100 may include, for example, mainframe computers, servers, distributed cloud computing environments, thin clients, thick clients, personal computers, PC networks, laptops, tablets, mini-computers, multi-processor based systems, micro-processor based systems, smart devices, smart phones, set-top boxes, programmable electronics, or any other similar computing device, an embodiment of which is described in more detail in FIG. 1.

Computing system 100 includes one or more hardware processors 152A, 152B (also referred to as central processing units (CPUs)), a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web-based or cloud-based server 120 over a public or private communications network 99. For instance, a web-site may include a financial institution that records/stores information, e.g., multiple financial transactions occurring between numerous parties (entities), loan processing, insurance claim processing and/or electronic transactions. Such loan processing, insurance claim processing, and/or electronic transactions may be stored in a database 130B with associated financial and entity information stored in related database 130A.

Further, as shown as part of system 100, there is provided a local memory and/or an attached memory storage device 160, or a remote memory storage device, e.g., a database, accessible via a remote network connection for input to the system 100.

In the embodiment depicted in FIG. 2, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programmed modules in an associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system 100 as a risk assessment tool for detecting risky financial transactions, and optionally creating alerts, the local or remote memory 160 may be configured for storing information, e.g., data 162, including for example, entity/accounts/properties data; relationships data, meta-data, etc. Such data 162 can include but is not limited to: parties, accounts, transactions, claims, events, updates, and associated metadata obtained from transactions stored in the electronic databases 130A, 130B. Alternately or in addition, the entity/customer data, accounts, transactions, claims, events, entity relationships, updates, and meta-data 162 can be stored in a separate local memory storage device attached to the computer system 100.

Memory 150 of computer system 100 stores one or more processing modules that include, for example, programmed instructions adapted to perform risk assessment and/or contribute to risk assessment. In one embodiment, one of the programmed processing modules stored at the associated memory 150 includes a data ingestion module 165 that provide instructions and logic for operating circuitry to access/read large amounts of data (e.g., parties, accounts, transactions, claims, events, etc.) for use by other modules that process and analyze the data to access risk; create, build, and/or read graphs; and in the context of this disclosure capture data transformations in machine learning (ML) models, and in an aspect select an optimal ML model, preferably in data intensive environments. In one or more embodiments, the input data for data ingestion module 165 comprises parties, accounts, transactions, claims, events, payment history, etc. For example, where a financial institution, such as for example a bank, desires to determine if there is a transaction risk or determine the risk of a money laundering scheme or other fraud, the input data can comprise: the transactions occurring with or being processed by the financial institution; the parties to any financial transaction with or through the financial institution; account information (the customers) of the financial institution, the present status or state of any financial transaction, etc. In the case of an insurance organization and the like, the input data can comprise: the parties doing business with the insurance organization; the claims made with the insurance organization; policy information; the status of the current claim; the identity of any agencies or brokers that were involved in underwriting the policy; and any parties involved in treating the claim, e.g., auto body shop fixing the motor vehicle, physician treating patient, etc. The examples above are not limiting and there can be other situations where the system will have application, and additional or other input data can be provided.

In an embodiment, a Model Training Component or Module 170 is included in the system, e.g., in memory 150, and provides instructions and logic for operating circuitry to capture data (training or live data) and train machine learning (ML) models 175. In one or more embodiments Model Training Component 170 leverages cognitive capabilities. A cognitive system (sometimes referred to as deep learning, deep thought, or deep question answering) is a form of artificial intelligence that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art.

Model Training Component or module 170 or memory 150 can include a probabilistic risk model to determine a transaction risk probability based on the variables or features of the transaction and metadata. Module 170 can invoke ML Model 175 to perform supervised (or unsupervised) machine learning techniques for detecting business risk (including detecting suspicious activity indicative of criminal activity, e.g., fraud), as known in the art, e.g., supervised learning using a regression model to predict a value of input data (classification) and unsupervised learning (clustering) techniques. Based on features and metadata, techniques employing Hidden Markov Models or Artificial Neural Networks may alternatively or additionally be employed to compute a risk associated with the particular party/transaction. The result of the machine learning model in an embodiment can be the computing of a risk "weight" or score attributed to the particular party or transaction.

Another optional programmed processing module stored at the associated memory 150 of system 100 includes a Risk-by-Association analyzer employing logic and instructions for performing a Risk-by-Association analysis based upon associations found in the data. For example, in the context of financial fraud detection, the Risk-by-Association analysis performed is used to establish "suspicion" of an entity based on "associations" or "patterns" in the data (e.g., transaction interaction partner(s) of a suspicious entity, or entities that share functions). Such analysis methods can employ one or more risk-by-association machine learned methods and/or models: Random Walk with Restarts (RW), Semi-Supervised Learning (SSL), and Belief Propagation (BP), as known in the art. Such risk-by-association method (s) and/or model(s) results in computing a risk-by-association score. Based on the computed Risk-by-Association analysis score, an alert and/or suspicious activity report (SAR) can be produced, and an analyst can analyze the alert and/or SARs and provide feedback as to a potential risk level of a party and/or transaction. The risk-by-association module can be part of Model Training Component 170.

In one embodiment, another optional processing module stored at the associated computer memory 150 includes a pattern determination module employing logic and instructions for detecting any data patterns indicative of business risk in the transaction. The pattern detection module can receive data, and processes the data to detect any known type of data patterns. The pattern detection module in an embodiment reads data and detects patterns of behavior or activity. The pattern detection module implements logic and program circuitry to receive input configuration data, receive training data, historic data, current data, and/or actual live data to detect data patterns. In one or more embodiments the pattern determination module leverages cognitive capabilities. A cognitive system (sometimes referred to as deep learning, deep thought, or deep question answering) is a form of artificial intelligence that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art. The pattern detection module in an embodiment can be part of the Model Training Component Module 170.

In an embodiment, another optional processing module stored at the associated computer memory 150, and or as part of Model Training Component Module 170 is Graph Module 180. Graph Module 180 employs instructions and logic for operating circuitry to read or access, and/or form/build, a graph for use in detecting risky business transactions and other graphs for use in detecting suspicious activity typically associated with fraud, money laundering, and/or criminal activity. Graph Module 180 in an embodiment receives data and loads the data into the graph. In one or more embodiments, graph module 180 can be used to generate an implication tree. In other instances, Graph Module 180 reads, obtains, or accesses data from a graph. In most instances, large amounts of data are input and processed by the data ingestion module 165 and the machine learning model might produce data for use in a graph, for example an implication tree. The implication tree includes for example, branches, nodes/leaves and/or relationships, such as data state changes. Nodes or branches can represent implications, e.g., future data state possibilities, while nodes or leaves can represent machine learning models. In an embodiment, graph module 180 can additionally include and/or process meta-data.

Memory 150 optionally includes a supervisory program having instructions for configuring the computing system 100 to call one or more, and in an embodiment all, of the program modules and invoke the operations of the risk assessment tool 100. In an embodiment, such supervisory program calls methods and provides application program interfaces for running the model training component module, the pattern detection module, and/or the risk-by-association analyzer module, including the various machine learning (ML) models for detecting business risk and/or activity indicative of business risk using the data, for example, ingested, received and/or read by the data ingestion module 165.

At least one application program interface 195 is invoked in an embodiment to receive input data from a "user". Via API 195, the user inputs data or has data files and sets loaded into Model Training Component Module 170. The Model Training Component 170 in an embodiment selects a machine learning model and produces a result which can be reviewed by the user. The user in an embodiment can review the results.

Figure 3:
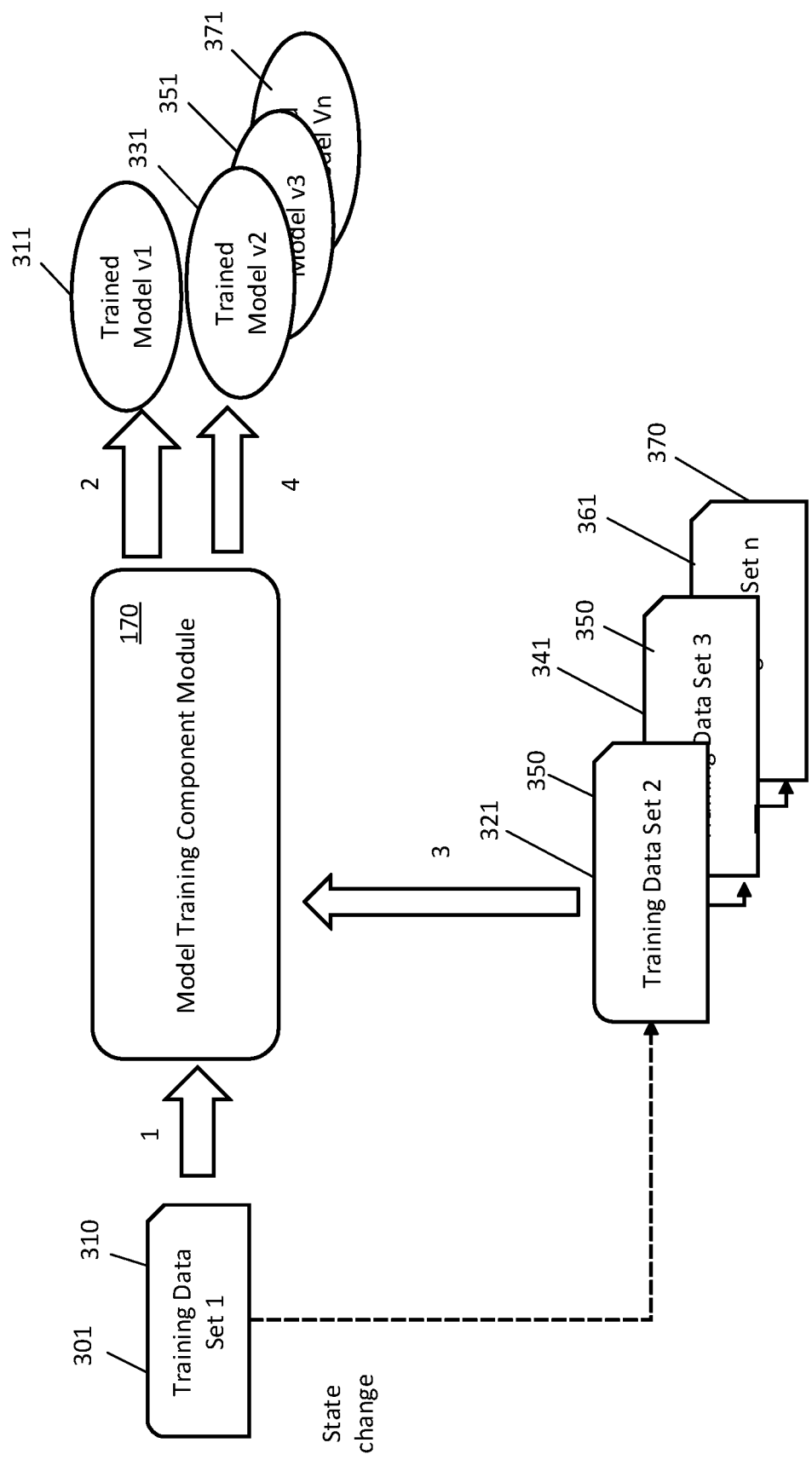
FIG. 3 schematically illustrates an embodiment of the model training component of FIG. 2 ingesting electronic data sets, including electronic training data sets.

FIG. 3 illustrates the Model Training Component module 170 of FIG. 2 receiving data (training or live data) and outputting trained machine learning model(s). A model, e.g., a machine learning (ml) model, is a file that has been trained to recognize certain types of patterns, for example on or from an implication tree. A model in an embodiment is trained over a set of data, providing it an algorithm that it can use to reason and learn from data. As shown in FIG. 3, training data set 1 (301) has a number of attributes 310 that are fed into Model Training Component Module 170 and trained machine learning (ml) Model v1 (311) is output by Module 170. Each training data set, for example training data set 1 (301), has a number of attributes A, for example attributes 310. FIG. 3 shows data training set 2 (321) having a number of attributes 330 fed into Model Training Component Module 170 and trained machine learning (ml) Model v2 (331) is output by Module 170. FIG. 3 also shows data training set 3 (341) having a number of attributes 350 fed into Model Training Component Module 170 and trained machine learning (ml) Model v3 (351) is output by Module 170. FIG. 3 further shows data training set 4 (361) having a number of attributes 370 fed into Model Training Component Module 170 and trained machine learning (ml) Model v4 (371) is output by Module 170.

Figure 4:
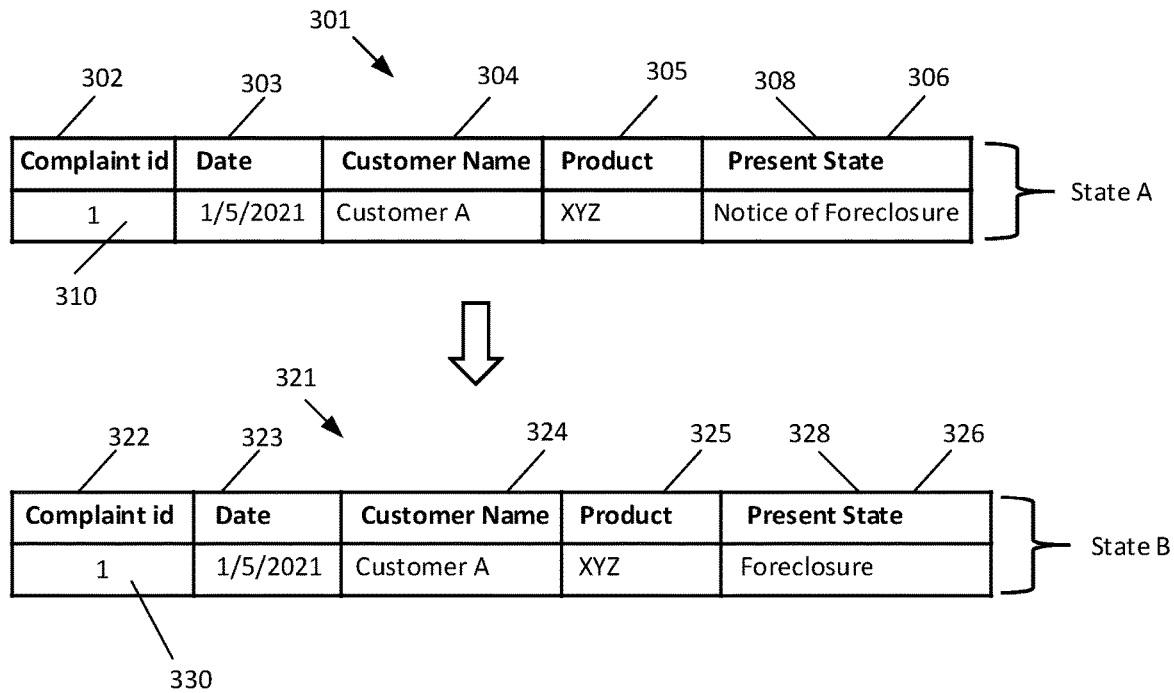
FIG. 4 diagrammatically illustrates data attributes of a data record undergoing a data state transition between a new electronic data set and a previous electronic data set.

Attributes A of the training data sets can be represented in a number of columns where each column identifies an attribute A. For example, training data set 1 (301) having attributes 310 is shown in FIG. 4 which has a number of columns c1 (308) that contain the attributes A (310) of training data set 1 (301). In FIG. 4, training data set 1 (301) has five columns 308 identifying the attributes 310 of training data set 1 (301) that are labeled "Complaint Id" (302), "Date" (303), "Customer Name" (304), "Product" (305) and "Process" (306). The attributes (310) of training data set 1 (301) define the "state" of the training data set 1 (301). The columns 308 contain values for the attributes 310 of training data set 1 (301) and collectively represent state A. Each training data set is a set of attributes which may be represented by columns and can define a State.

Training data set 1 (301), and in particular the attributes 300 of training data set 1 (301), can undergo changes which can result in a change of state. A change in state for a training data set can be a change, deletion, and/or addition of one or more attributes of the data that is used to train the model. In an example, Example 1, where a customer who gets a loan/mortgage from a bank and is making payments, but overtime he misses payments, the loan defaults, and the loan goes into foreclosure, the state transitions or stages could be regular loan (payments being made), delinquent loan (missed payment), default loan, notice of foreclosure, and foreclosure. The set of values for the attributes define the data record and are referred to as the state. FIG. 4 represents the data records (the various attributes of the data sets) for loan/mortgage Example 1 above where the loan/mortgage is in a notice of foreclosure state or stage, referred to as state A in FIG. 4, and has changed, transitioned, and/or transformed to the foreclosure state or stage, referred to as state B in FIG. 4. The record or training set data 1 (301) undergoes changes to one or more attributes 310 and moves or transitions to State B. The attribute 310 in column 306 under the label "Present State" changes in FIG. 4 from "Notice of Foreclosure" to "Foreclosure" as shown by attribute 330 in column 326. The record of the attributes 330 of state B is training data set 2 (321).

The change from one state to another is treated as a state transition, and each state transition can give rise to further possible future states, also referred to as implications, and many possible noteworthy or significant future states. In one or more embodiments it is advantageous to capture the lineage of data state changes, e.g., capture state transitions. The Model Training Component Module 170 in an embodiment captures the data state changes. In an aspect, Model Training Component Module 170 captures the data state change leading from trained model v1 (311) to trained model v2 (331), and the data state change leading from trained model v2 (331) to trained model v3 (351), etc. For example, Model Training Component Module 170 would capture the data state change from state A to state B in FIG. 4, including in an aspect the attribute changes in the data record. Preferably, Model Training Component Module 170 would be trained to capture state transitions that are significant indicators for that training data set.

Capturing the present state of the data and the data state lineage, e.g., the prior data states or data state transitions, facilitates and contributes to determining possible implications that may arise from the present state and the data state lineage. Generating the full set of possible implications facilitates and contributes to forming the implication tree, evaluation of the machine learning (ml) models, and selection of the optimal machine learning (ml) model for the data set.

Turning back to Example 1, in the context of a financial institution making a loan or mortgage to a customer, the loan can progress through and have a number of different states during the course of the loan. These states are sometimes referred to as domain states and can be obtained from domain segment data from open industry sets. The domain states can also be provided by the client or customer, or be industry standards. Table 1 below shows the Existing or Domain States and Tag Name for the Existing/Doman states for Example 1, e.g., a loan and/or a mortgage to a customer. Table 2 shows an example of the state transitions for the loan/mortgage transaction of Example 1 that undergoes changes in the domain states from the regular state, indicating that the loan is in good standing, to foreclosure and/or Bankruptcy.

TABLE 1

Existing/Domain States of Loan

| Existing states and notations | Tag Name |
| --- | --- |
| Regular | a |
| Delinquent | b |
| Default | c |
| notice of foreclosure | d |
| foreclosure | e |
| bankruptcy(13, 7) | f1, f2 |
| forbearance | g |
| reinstatement | h |
| short sale | i |
| liens | j |
| pay off | k |

TABLE 2

Data State Transitions

| ID | Date | Customer name | Product | Present States |
| --- | --- | --- | --- | --- |
| 1 | Feb. 21, 2020 | Customer A | XYZ | Regular - Delinquent |
| 1 | Feb. 21, 2020 | Customer A | XYZ | Delinquent-Default |
| 1 | Feb. 21, 2020 | Customer A | XYZ | Default - Notice of Foreclosure |
| 1 | Feb. 21, 2020 | Customer A | XYZ | Foreclosure Begins |
| 1 | Feb. 21, 2020 | Customer A | XYZ | Foreclosure - Forbearance |
| 1 | Feb. 21, 2020 | Customer A | XYZ | Foreclosure - Bankruptcy |

Figure 5:
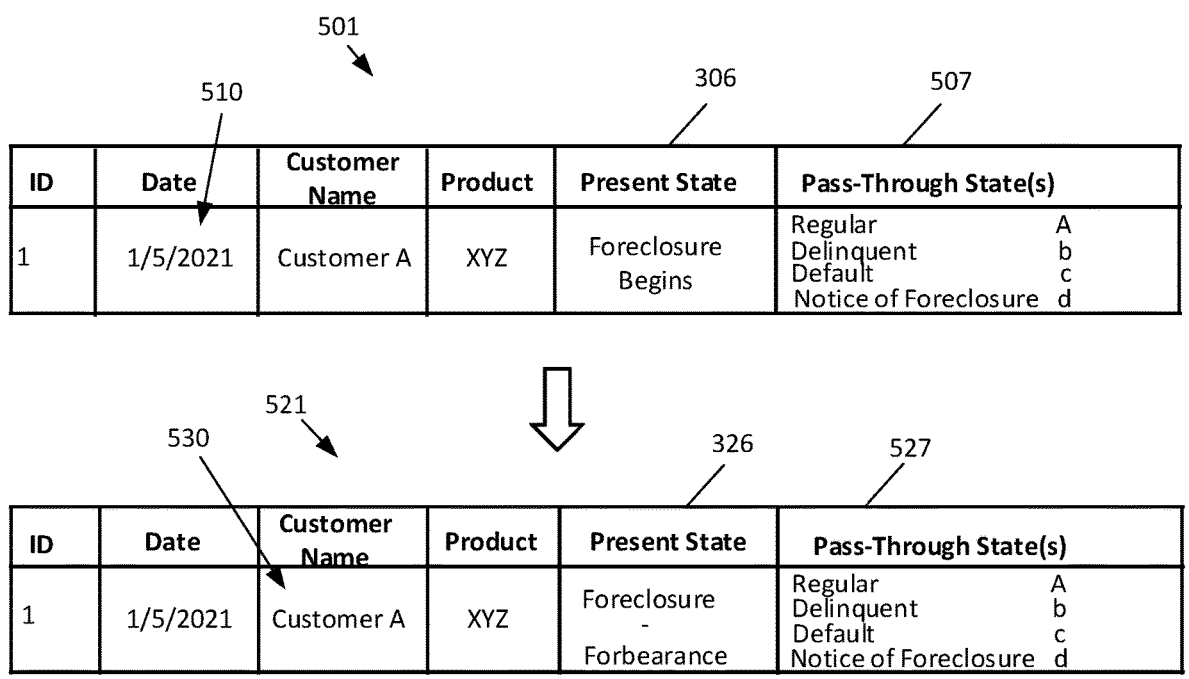
FIG. 5 diagrammatically illustrates data attributes of a data record undergoing a data state transition between a new electronic data set and a previous electronic data set wherein a present state and prior pass-through data states are captured.

FIG. 5 shows the data lineage captured for a portion of the data state changes in Example 1 where the data lineage is represented in columns 507 and 527 as "Pass-Through State(s)". For Data Set 501 having attributes 510 in FIG. 5, the present state is shown in column 5 (306) as "Foreclosure Begins" and the data state transitions or prior states, also referred to as pass-through states, to get to the present state is shown in column 6 (507). The pass-through states, or data lineage, shown in column 507 for data set 501 is indicated as Regular, Delinquent, Default, and Notice of Foreclosure, showing that the loan has progressed through those different states to arrive at the "Present State" as indicated in column 306. FIG. 5 also shows Data Set 521 having attributes 530, where the present state is shown in column 5 (326) as "Foreclosure—Forbearance" and the data state transitions or prior states, also referred to as pass-through states, to get to the present state are shown in column 6 (327). The pass-through states, or data lineage, shown in column 527 for data set 521 is indicated as Regular, Delinquent, Default, and Notice of Foreclosure, showing that the loan has progressed through those different states to arrive at the "Present State" as indicated in column 326. Preferably the data state transitions (information recorded at columns 507, 527) are captured and saved as each data record 501, 521 changes, e.g., the attributes and the state of the loan changes.

The Model Training Component Module 170 also in an embodiment generates, forms, tracks, and/or maintains the implication tree for the loan. The implication tree represents the past or previous states (the pass-through states), the present state, and the possible future states that the loan could undergo and/or attain. Any change in the existing data, for example an addition, deletion, or change, could be treated as a potential candidate for implication tree formation. In Example 1, a loan to a customer in the regular state has a number of inherent implications (possible future states), such as, for example, late payment, stop payments, loan payoff, loan transfer, etc. So at any given state, other states are possible, and each state could give rise to other states (other implications), some of which could be more important than others. FIG. 6 illustrates a diagrammatic illustration of an implication tree, implication tree 670 where the trunk 675 is the granting of the loan, and from there the state or status of the loan can branch into many different states, which can lead to other further states. Box 680 in FIG. 6 represents one of the branches of implication tree 670. FIG. 7 shows example branch 680 of implication tree 670 of FIG. 6, where a number of nodes 765 represent possible implications which may result as the status or stage of the data (the loan) changes. As illustrated in FIG. 7, at 782 the (loan) state transitions from state X to state X'. As a result of the transition from state X to state X', there are a number of possible future states, e.g., implications 765, that the loan state can attain. As indicated at 784, one of the implications 765 is that state X' could transition to state X", or as indicated at 786, one of the implications 765 is that state X' could transition to state X1. The change from state X' to state X" at 784 could also lead to further state changes or implications 765 illustrated at 788 where the state can change from state X" to state X''' and at 790 where the state can change from state X" to state X1. Accordingly, from the state change from X to X' many different state changes could later result. The implication 765 at 784 where the data state can change from X" to X''" or to X1 represents a branch 766 as it is not an end point and leads to further implications 765. The implication 765 at 786 which represents an endpoint where no further data state transitions are possible would represent a leaf 786. The leaves 786 in the implication tree 670, generally at the end nodes of implication tree branches 680 represent models that would reach or attain that data state by way of that path or branch, e.g., pass-through states.

The Model Training Component Module 170 in one or more embodiments captures the data state transitions (the data lineage), and in one or more aspects also generates, tracks, and maintains the implications I, e.g., possible future states, as a result of the present state and the respective data state changes, e.g. the prior or pass-through states. In one or more embodiments, the Model Training Component Module 170 generates the implications I from the data state lineage changes. FIG. 8 shows the implications I, or possible future states, in column 808 generated, tracked and generated based upon the present state shown in column 306, the prior data state changes (the Pass-Through States) shown in column 507, and the attributes 810. Column 808 represents the possible future state transitions that could be achieved and/or attained in the future, and can be used to generate the implication tree.

Evaluating the implications, e.g., the possible future states, and the reachability of, e.g., the probability of attaining, those possible future states can be used to select the optimal machine learning (ml) model. That is, the probability or possibility of reaching a particular node or leaf in the implication tree is referred to as reachability. The nodes/leaves in the implication tree represent particular machine learning (ml) models, and the nodes/leafs with higher reachability values should represent optimal machine learning (ml) models for reaching that leaf node and optimal machine learning (ml) models for the data set. The node or leaf in the implication tree with the highest reachability in an aspect represents the optimal machine learning (ml) model for that data set in that present state with the prior pass-through states.

In one or more embodiments, the implication tree is formed from the training and/or live data. The implication tree is used to determine the optimal machine learning model to select for the given scenario, e.g., the current state. The possibility or probability of reaching a particular branch, node or leaf in the implication tree is referred to as reachability. Reachability R of a tree branch or node in the implication tree is a function of the number of hops or cardinality to get to the branch/node in the tree, the performance metrics of the parent branch (the data state lineage) in the implication tree, and the set of data changes required to reach the branch/node. Reachability R can be represented as:

R(model branch)=F(number of hops, performance metrics of parent branch, set of data state changes required)

Performance metrics of the data state transitions are Precision, Recall and Focal Point of the state transitions. These state transitions are calculated from the training data set to the respective live data set. Precision of the data state transition is a measure of the number of changes in state transitions from training data to live data. Recall is a measure of the number of matching occurrences from the training data to the live data. Focal Point is the cluster focal point of the set of data state transitions from the training data set to the live data set.

Calculating the performance metrics for the leaves/nodes of the tree are a function of the set of state transitions from the new training/live data set. Where X is defined as a set of state transitions from the new data, and data is in one or more conditions, $f(x)$, $f(x')$, $f(x'')$, ... $F(x^x)$, where $f(x')$ can lead to $f(A)$, $f(B)$ and $f(C)$ and many more. All the data state transitions involved are clustered and cumulative metrics are calculated. Clustering is a grouping of set of the state transitions from the base node of tree to the point of the last connected/involved node in the path of the end node and finding the performance metrics of them (e.g., Precision, Recall, and Focal Point). Clustering logic is calculated based upon the decision tree methodology for the data state transitions. Cumulative metrics is a collective metrics average from the base node of the tree to the last connected/involved node in the path of the end node. In one or more embodiments, the individual metrics of each node or tree leaf is reviewed or analyzed, where the individual metrics are the performance metrics of that particular node (e.g., Performance, Recall and Focal Point for that particular, single node. If the deviation of that tree node from the previous data state transition to the current state transition is less than a threshold, for example ten percent (10%), then that branch/node is retained, otherwise the branch is discarded as a high variance model in the implication tree. The high variance models are discarded in one or more embodiments to prune the implication tree to remove remote possibilities. The threshold value can be calculated, predetermined, selectable, programmable, and/or learned, and can have values higher than or lower than the ten percent (10%) discussed above. The reachability of the remaining leaves/nodes, e.g., the retained leaves/nodes, can be calculated for each set of data state change from the previous data state, e.g., the previous model instance.

A system and/or method is disclosed that in an embodiment includes a machine learning (ml) model that has been trained using an initial data set, e.g., an initial training data set (Td(1)). For example, Model Training Component Module 170 in FIG. 3, which contains a machine learning (ml) model module 175, is fed an initial data set Td(1) (301). The initial data set 301 preferably contains structured tables of attributes, although certain attributes may be unstructured, for example, a text or image. State transition capture in one or more embodiments can be performed more efficiently and effectively when the data is structured. A subset of attributes from the initial data set Td(1) (301) which have an impact on, contribute to, and/or are significant to, the machine learning model's predication is provided (referred to as significant attributes A(s)). When the machine learning model needs to be retrained with newer data sets, e.g., training or live data files (Td(2), Td(3) . . . Td(n)) are made available, and the data state transition process explained in more detail below is triggered, as is a method and/or system to capture the data state transitions (the data state lineage), and in an aspect generate the implication tree, calculate reachability of the various tree branches/nodes/leaves, and/or reach an optimal machine learning (ml) model.

Figure 9:
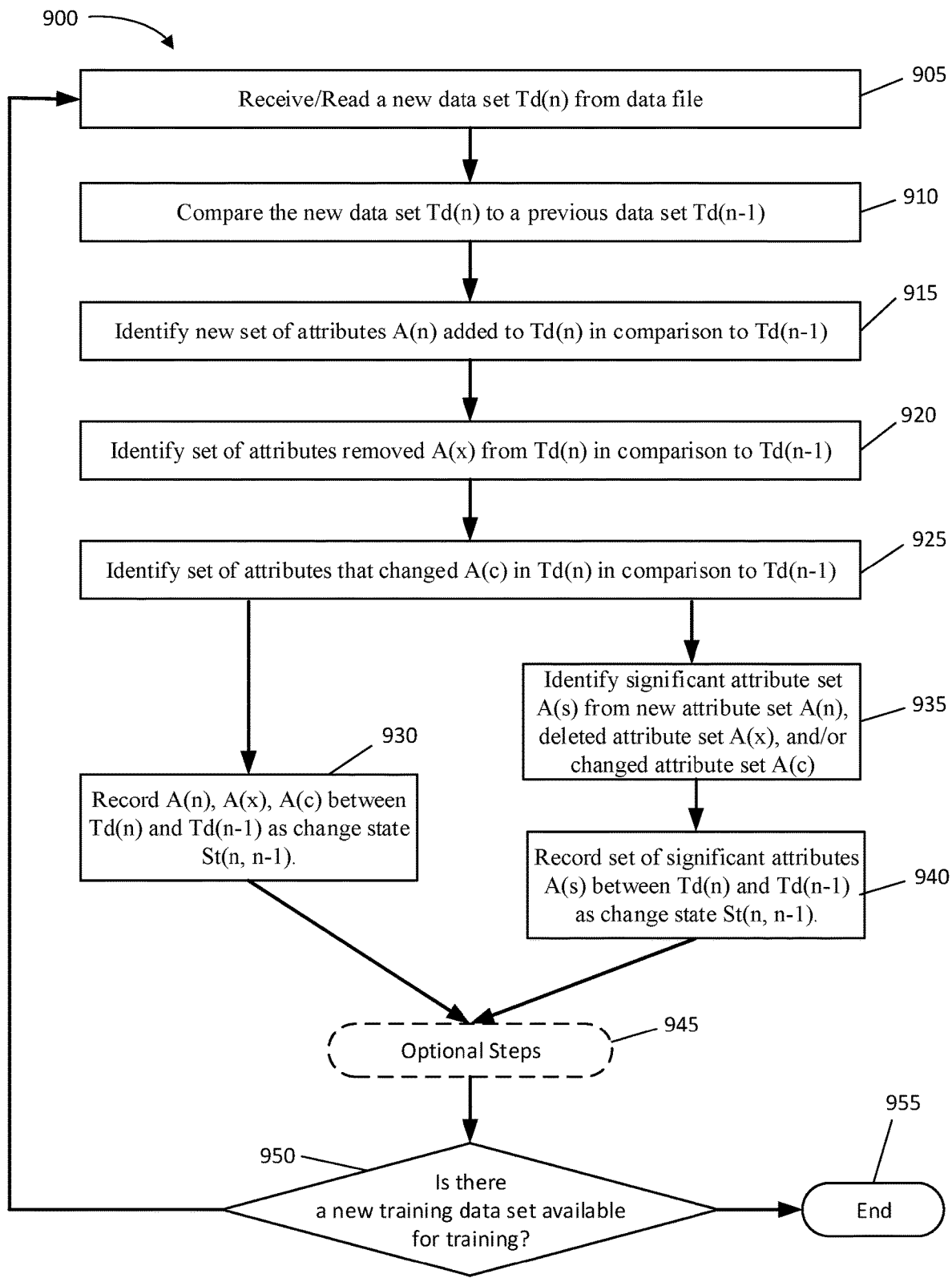
FIG. 9 illustrates a diagrammatic flowchart of a method according to an embodiment of the present disclosure of capturing data state transitions between a new data set and previous data sets.

FIG. 9 is an exemplary flowchart in accordance with one embodiment illustrating and describing a method 900 of capturing data transitions (data state lineage) in machine learning (ml) models. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

In one or more aspects, the method 900 includes a machine learning (ml) model trained on training data that at 905 receives new training data or live data. In an embodiment, Model Training Component reads new training data set Td(n) from the training data file, or a live data set. Preferably new training data or live data is received and/or read as structured data, for example as a structured table of attributes A, for example where the attributes are arranged in columns. At 910, a comparison is made between the previous data set(s) Td(n−1) and the new data set Td(n). For example, at 910 Training Model Component compares Td(n−1) and Td(n). At 915, one or more attributes newly added to the live or training data set Td(n−1) are identified. At 920, a comparison is made between the previous data set(s) Td(n−1) and the new data set Td(n) and a new set of attributes A(x) deleted or removed from Td(n−1) is identified. For example, at 920 Training Model Component compares Td(n−1) and Td(n) and identifies one or more newly deleted or removed attributes A(x) from the previous data set Td(n−1). At 925, a comparison is made between the previous data set(s) Td(n−1) and the new data set Td(n) and a set of attributes A(c) that has changes is identified. For example, at 925 Training Model Component compares Td(n−1) and Td(n) and identifies one or more attributes A(c) that has changed between Td(n−1) and Td(n).

In one or more embodiments, at 930 the changed attribute set A(c), the removed attribute set A(x), and/or the added or new attribute set A(n) between the previous data set Td(n−1) and Td(n) are saved or recorded. The changed attribute set A(c), the removed attribute set A(x), and/or the added or new attribute set A(n) between the previous data set Td(n−1) and Td(n) in an aspect at 930 are saved or recorded as changed state data St(n, n−1). In one or more embodiments the changed attribute set A(c), the removed attribute set A(x), and/or the added or new attribute set A(n) between the previous data set Td(n−1) and Td(n) are saved or recorded in column and/or tabular format. The data lineage, e.g., the prior states also referred to as the pass-through states, in one or more aspects are saved or recorded at 930. The data lineage in an example can be captured as in FIG. 5, where the previous data set 501 with its attribute set 510 including the pass-through state(s) (e.g., data state lineage) identified in column 507 are saved, and the current data set 521 with its attribute set 530 are saved including the pass-through state(s) (e.g., data lineage) identified in column 527 are saved. That is, in one or more embodiments, the present data set (e.g., training data set) is run or sent through prior state engine to get the prior pass-through states and the present state as illustrated in FIG. 5.

The process 900, after 930, can continue to 945 where one or more optional steps to be discussed in connection with FIGS. 10 & 11 can be performed. If no additional optional steps are performed at 945, the process 900 continues to 950 where it is determined whether there is new or any additional training (or live) data set available for training the machine learning (ml) model, in which case the process returns to 905 and receives and/or reads the new training (or live) data set from the data file. For example, the Model Training Component records or captures the changed, new, and/or deleted attribute set (A(c), A(n) and/or A(x)) at 930 and then proceeds at 950 to determine if there are additional data sets for training, and if so (950: Yes), then the Model Training Component proceeds to read/receive the new data set and repeats 905 through 930 and 950; and/or 905 through 925 and 935, 940, and 950; etc.

In one or more embodiments of process 900, at 935, the changed attributes A(c), the deleted attributes A(x), and/or the new attributes A(n) are reviewed and filtered to identify the attributes that are significant or impactful (referred to as significant attributes A(s)) in facilitating, contributing to, and/or driving a data state change. In one or more embodiments, the significant or impactful attributes A(s) that contribute to, facilitate, effect, drive, and/or constitute data state changes are identified by the customer, client, or user and can be predefined, predetermined, changeable, programmable, selectable, and/or machine learned. In one or more aspects, the deleted attribute set A(x) and the added attribute set A(n), will not be filtered and only the changed attribute set A(c) will be filtered for significant or impactful attributes A(s) that effect, facilitate, impact, and/or contribute to a state change. For example, each added attribute set A(n) and/or each removed attribute set could constitute significant attributes A(s), so filtering or identifying a subset of the new attributes A(n) and/or removed attributes A(x) might be unnecessary. In an aspect, significant attributes A(s) from the changed attribute set A(c) are identified at 935. It can be appreciated that in addition, or alternatively, at 935 significant attributes A(s) from the new/added attribute set A(n) and/or significant attributes from the removed attribute set A(x) can be identified.

At 940, in one or more embodiments, the significant attribute set A(s) is saved or recorded. It will be appreciated that the significant attribute set A(s) can include the subset of changed attributes A(c), and each of the removed attribute set A(x), and/or the added or new attribute set A(n) between the previous data set Td(n−1) and Td(n). In an aspect at 940 the significant attribute set A(s) is saved or recorded as changed state data St(n, n−1). In one or more embodiments the significant attribute set A(s) between the previous data set Td(n−1) and Td(n) is saved or recorded in column and/or tabular format. The data state lineage, e.g., the prior data states also referred to as the pass-through states, in one or more aspects are saved or recorded at 940. The data state lineage in an example can be captured as in FIG. 5, where the previous data set 501 with its attribute set 510 including the pass-through state(s) (e.g., data state lineage) identified in column 507 are saved, and the current data set 521 with its attribute set 530 are saved including the pass-through state(s) (e.g., data state lineage) identified in column 527 are saved. That is, in one or more embodiments, the present data set (e.g., training data set) is run or sent through prior state engine to get the prior pass-through states and the present state as illustrated in FIG. 5.

The process 900, after 940, can continue to 945 where one or more optional steps to be discussed in connection with FIGS. 10 & 11 can be performed. If no additional optional steps are performed at 945, the process 900 continues to 950 where it is determined whether there is new or an additional training (or live) data set available for training the machine learning model, in which case the process returns to 905 and receives and/or reads the new training (or live) data set from the data file. For example, the Model Training Component at 940 records or captures the significant attributes A(s), which may include a subset of the changed, new, and/or deleted attribute set (A(c), A(n) and/or A(x)), and then proceeds at 950 to determine if there are additional data sets for training, and if so (950: Yes), then the Model Training Component proceeds to read/receive the new data set and repeats 905 through 925. If at 950, there are no data training (or live data) sets (950: No), then process 900 continues to 955 where the data capture process ends (until new training data is available).

Once the machine learning model is trained with training data, and data changes have been captured, e.g., deleted attributes A(x), new attributes A(n), and/or changed attributes A(c) have been captured, the effects of the data change, and in particular the effects of the data state change on the machine learning (ml) model can be determined. Capture of data state changes, e.g., the pass-through states, and the present state can be used to determine the implications of the state change on the machine learning (ml) model, and those implications can be branched out into an implication tree to provide a holistic view of each data state transformation on the model. Each individual state transition and its effects on the final claim (e.g., the selected/optimal model) helps build the implication tree, where the implication tree facilitates and assists in the evaluation of loan/claim/transaction at issue, and selection of an optimal machine learning model. Every branch in the implication tree (see FIG. 7) reflects a data state transition that affects the machine learning model. A set of data state changes will suggest or point to a specific branch in the implication tree, and traversing each node in the whole implication tree and calculating the reachability of each node/leaf (model) to narrow down the possibilities to the specific node/leaf with the highest probability of being reached, will help to finalize and check which machine learning model to select at runtime.

Figure 10:
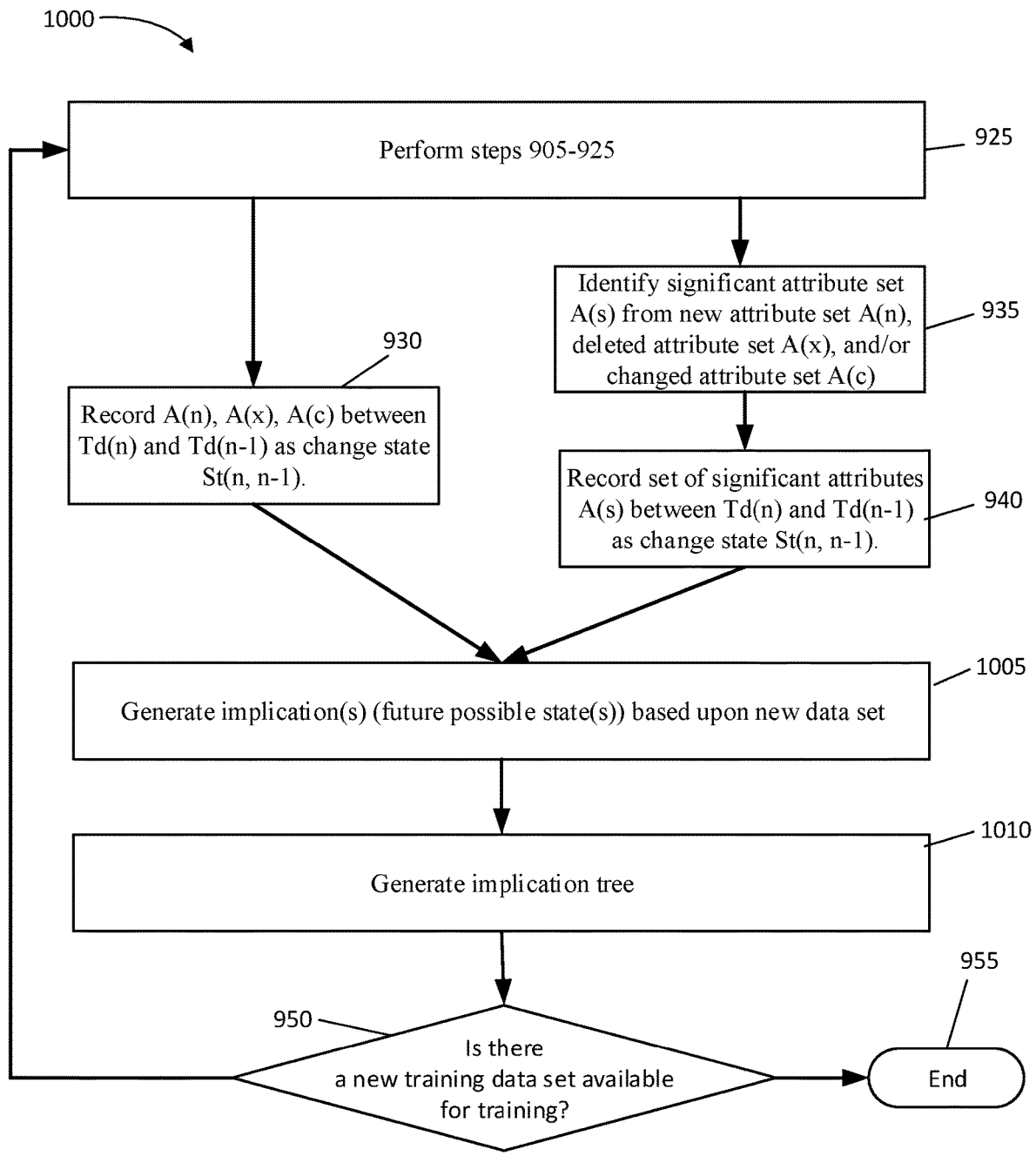
FIG. 10 illustrates a diagrammatic flowchart of a method according to an embodiment of the present disclosure of generating implications representing possible future states of a data set.

FIG. 10 is an exemplary flowchart in accordance with an embodiment illustrating and describing a method 1000 of generating or creating the implications, e.g., possible future states, and in an aspect generating or creating an implication tree, e.g. future implication trees, that includes the past data states (e.g., the pass-through data states), the present data state, and the future possible data states. In one or more embodiments, the implications and implication tree are generated and/or created using the captured data state transitions (data state lineage) in the machine learning (ml) models. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

The process 1000 in one or more embodiments includes the process 900 of FIG. 9, where the present state and the pass-through states that were captured in 930 or 940 are used to generate the future possible data states based upon the present data state and/or pass-through data states. Other methods and/or systems for capturing the current data state and pass-through data states are contemplated. At 1005, generate all possible future data states (implications) from the new data set, e.g., new training data set Td(n). For example, at 1005, all the possible future data states (implications) based upon the current data state (and pass-through data states) are generated as are all the possible future data states (implications) based upon each of those possible future data states, etc., until every possible future data state (implication) from the current data state has been generated. The data states through which the data (transaction) can pass, including the future data states are typically provided, for example taken, from industry standards or provided by the client. Based upon the current/present data state, the Model Training Component in an embodiment generates the possible future data states (implications) that can be reached from the current data state. Using the present data state, the pass-through data states, and the future implications an implication tree is built at 1010. The Model Training Component in one or more embodiments determines, builds, and/or generates the implication tree. In one or more embodiments, machine learning models are associated with the nodes/leaves in the implication tree.

Figure 11:
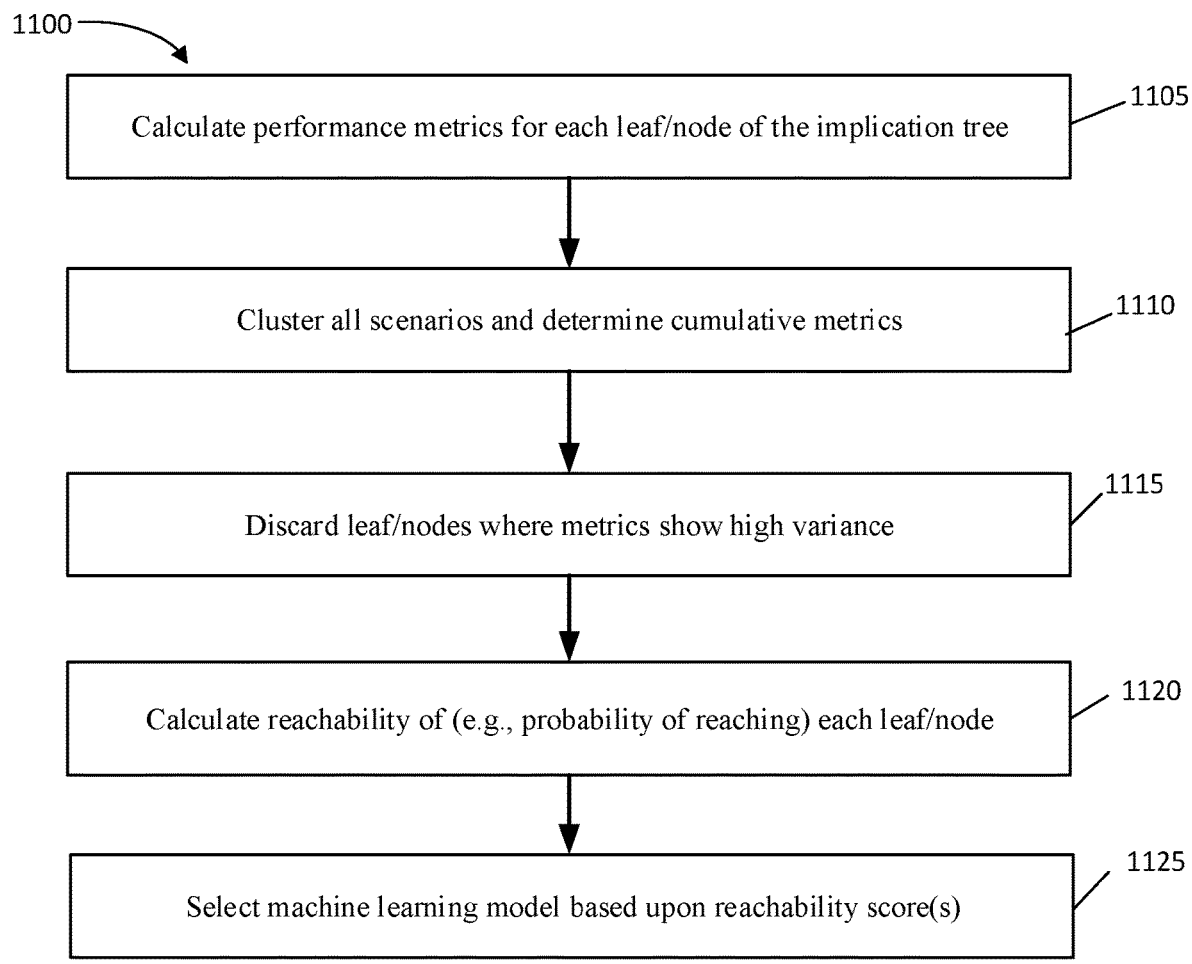
FIG. 11 illustrates a diagrammatic flowchart of a method according to an embodiment of the present disclosure of calculating a reachability score of a node in an implication tree to facilitate selecting an optimal machine learning model.

FIG. 11 is an exemplary flowchart in accordance with an embodiment illustrating and describing a method 1100 of selecting the model, preferably the optimal machine learning model for the current data state, e.g., the current data state of a loan transaction. In one or more embodiments the reachability, e.g., the probability of reaching a particular node in the implication tree which represents the machine learning model, is calculated, and one or more of the models can be selected, including the model having the highest reachability score (e.g., the greatest probability of being reached) can be selected. While the method 1100 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11, but the process may be integrated and/or one or more steps may be performed together, simultaneously, or the steps may be performed in the order disclosed or in an alternate order.

With a provided or generated implication tree, the method 1100, at 1105, calculates the performance metrics for each leaf/node of the implication tree. In one or more embodiments, X is defined as set of state transitions from the new test data where if data is in one or more conditions $f(x)$, $f(x')$, $f(x'') \ldots f(x^x)$ and $f(x')$ can lead to $f(A)$, $f(B)$ and $f(C)$ and many more. At 1110, all the scenarios involved are clustered, and cumulative metrics are calculated/determined. In one or more aspects, at 1115 leaf/nodes of the implication tree where the metrics have a high variance are discarded. In one or more embodiments, at 1115 tree branches and/or tree leaves whose individual metrics demonstrate a deviation of less than a threshold are retained, and the remaining tree branches and/or tree leaves are discarded, e.g., tree branches and/or tree leaves having individual metrics that demonstrate a deviation at or above the threshold are removed, deleted, ignored, and/or discarded from the implication tree. In one or more embodiments, the threshold can be ten percent (10%), although other values are contemplated. The purpose of 1115 is to prune the implication tree and remove branches and/or tree leaves that represent high variance models, e.g., models (leaves) in the implication tree that are unlikely or have a very low probability of being attained. The steps directed to pruning the tree are optional and can cut down on the calculations to be performed and potentially increasing performance.

At 1120 the reachability of each leaf/node in the implication tree is calculated to determine the probability of reaching that particular leaf/node. In this regard the reachability of each leaf/node is the probability of reaching the model represented by that leaf/node. The reachability calculated at 1120 can be for each leaf/node in the pruned implication tree, or in the unpruned implication tree (e.g., where branches and/or leaves/nodes have not been discarded). The reachability R of a leaf/node is a function of the number of hops (cardinality) to the leaf/node, the performance metrics of the parent branch (and all intermediate branches) of the node/leaf in the implication tree, and the set of data state changes needed to reach the node/leaf in the implication tree from the present data state. The reachability R can be represented as R=f(number of hops to the leaf node, performance metrics of the parent branch (and all intermediate branches) in the implication tree, set of data state changes to reach the leaf/node in the implication tree). With the reachability of each of the nodes calculated, at 1125 the reachability scores of each of the nodes calculated can be used to select the optimal machine learning model to utilize. For example, the nodes with the highest reachability scores, and/or the node with the highest reachability score, representing the highest probability of reaching that node, can be chosen, where each node represents a particular machine learning (ml) model. Should a new data set be available, the process 1100 can repeat as illustrated in method 900 and 1000 where the new data set is processed to capture changed states, generate implications, generate a new implication tree(s), and process 1100 can calculate the new reachability scores for the nodes in the new implication tree, and optionally select an optimal machine learning model.

Figure 12:
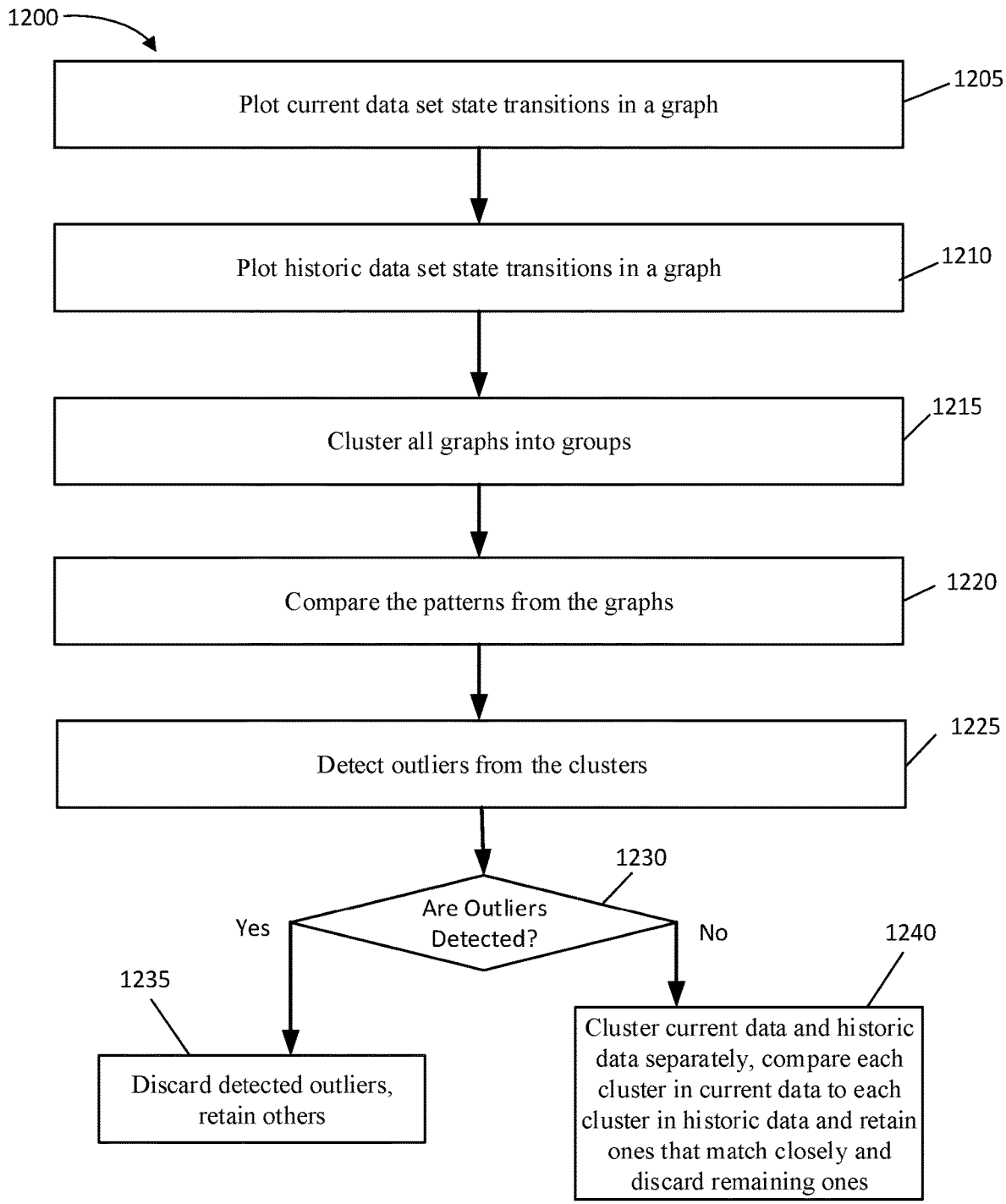
FIG. 12 illustrates a diagrammatic flowchart of a method according to an embodiment of the present disclosure of pruning and/or filtering an implication tree to discard low probability machine learning models.

FIG. 12 is an exemplary flowchart in accordance with an embodiment illustrating and describing a method 1200 of clustering the data and pruning the implication tree as discussed in connection with method 1100 and FIG. 11. While the method 1200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 12, but the process may be integrated and/or one or more steps may be performed together, simultaneously, or the steps may be performed in the order disclosed or in an alternate order.

In a further implementation, clustering and discarding leaf/nodes, representing models with high variance, e.g., pruning the implication tree, can include one or more processing steps as illustrated in FIG. 12 and discussed below. At 1205 data state DT1, DT2, DT3, etc. for training data (training data set or live data set) are plotted in a graph GP1. Historic data state transitions HD1, HD2, HD3, etc., for historic data (e.g., prior data sets) at 1210 are plotted in another graph GP2. At 1215 cluster all graphs into groups. In an aspect an unsupervised clustering technique is used to cluster all the graphs, e.g., the current data set and historic data sets, into groups. Unsupervised clustering can be performed using artificial intelligence (AI). The artificial intelligence (AI) will form patterns based upon inputs generated from the current data set (GP1) and the historic data set (GP2). At 1220, compare patterns from the graphs, e.g., GP1 and GP2. The clustering AI in an aspect will compare the patterns from the graphs, e.g. GP1 (graph pattern from present/current data set) and GP2 (graph pattern from historic data set). In an embodiment, the AI will compare the patterns from the graphs, e.g., GP1 (current data set) and GP2 (historic data set), and detect similarities or matches, and detect outliers based upon the patterns encountered. The complete pattern generation, pattern detection, and pattern comparison in an aspect defines the AI clustering mechanism and is known in the art. In one or more embodiments the pattern generation, pattern detection and pattern comparison leverages cognitive capabilities. A cognitive system (sometimes referred to as deep learning, deep thought, or deep question answering) is a form of artificial intelligence that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art.

At 1225 it will be determined if there are outliers from the clusters. Valid models in an aspect are those models that do not have a large deviation as they match with historic data, while outliers, e.g., outlier models/state transitions, in an aspect are those models that have a large deviation from historic data. In one or more embodiments, the models that are within a threshold, e.g., ten percent (10%) of historic values are considered valid models (branches/nodes) and are retained, while models having a deviation that greater than (or equal to) to the threshold, e.g., ten percent (10%), are outliers. While a ten percent (10%) threshold is used to determine the amount of deviation to select outliers, it can be appreciated that a higher or lower threshold percentage or other criteria beyond a percentage threshold can be used to determine outlier models. At 1230, if outliers are detected (1230: Yes), then those outlier models are discarded at 1235 and the other (e.g., valid) models are retained to be further processed, for example in the method 1100 to select an optimal machine learning model.

If at 1230 no outlier models (e.g., leaf nodes) are detected (1230: No), then in an embodiment the process, can be further processed, for example, in the method 1100 without the implication tree being pruned, e.g., no outlier models being discarded. In an optional embodiment, if no outlier models are detected (1230: No) then at 1240 the current data set can be clustered separate from the historic data set, and each cluster in the current data set can be compared to the historic data set, and the models that are closely matched, e.g., that deviate less than a threshold, can be retained and the other models can be discarded. The process 1100 can continue without pruning the implication tree as described at 1240 to select an optimal machine learning model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of selecting a machine learning model comprising:
   providing a machine learning model trained with one or more electronic training data sets, the one or more electronic training data sets comprising a previous electronic training data set;
   receiving a new electronic data set;
   comparing the new electronic data set to the previous electronic training data set;
   identifying a new set of attributes added to the new electronic data set in comparison to the previous electronic training data set;
   identifying a removed set of attributes deleted from the new electronic data set in comparison to the previous electronic training data set;
   identifying a changed set of attributes in the new electronic data set that were modified in comparison to the previous electronic training data set;
   recording at least one of an attributes group consisting of: the new set of attributes, the removed set of attributes, the changed set of attributes, and combinations thereof, as data state transitions, including a present data state and all pass-through data state transitions which represent previous data states;
   generating future possible data state transitions based upon the present data state;
   generating an implication tree based upon the present data state, all the pass-through data state transitions, and future possible data state transitions, wherein the implication tree comprises nodes that represent the future possible data transitions and each said node further represents a respective machine learning model that corresponds to one or more of the respective future possible data state transitions; and
   selecting a node and a machine learning model using the implication tree.

2. The computer-implemented method according to claim 1, wherein the new electronic data set comprises a structured table of attributes.

3. The computer-implemented method according to claim 1, further comprising a Model Training Component that comprises the machine learning model, receives the new electronic data set, compares the new electronic data set to the previous electronic training data set, identifies the new set of attributes, the removed set of attributes, and the changed set of attributes, and records the at least one attributes group as data state transitions.

4. The computer-implemented method according to claim 1, further comprising identifying a significant attribute set that contributes to a data state transition in the new electronic data set.

5. The computer-implemented method according to claim 4, wherein the significant attribute set comprises at least one of the attributes group consisting of: the new set of attributes, the removed set of attributes, the changed set of attributes, and combinations thereof.

6. The computer-implemented method according to claim 1, further comprising, after recording at least one of the attributes group as data state transitions, checking if a current electronic data set is available, and if a current electronic data set is available, reading the current electronic data set and comparing the current electronic data set to the previous electronic training data set and the new electronic data set.

7. A computer-implemented method according to claim 1, further comprising calculating performance metrics for each node in the implication tree.

8. The computer-implemented method according to claim 7, further comprising clustering the performance metrics of each node in the implication tree and disregarding nodes demonstrating a high variance in the performance metrics while using any remaining nodes.

9. The method according to claim 7, further comprising:
calculating reachability scores for each node in the implication tree, wherein a reachability score is a function of a number of hops to the respective node, the performance metrics of a parent branch of the respective node, and the data state transitions to reach the respective node; and
selecting the node and the machine learning model using the implication tree based upon the reachability score of the node.

10. The computer-implemented method according to claim 8, wherein nodes demonstrating a high variance have a deviation from the clustering of other nodes of greater than ten percent (10%).

11. The computer-implemented method according to claim 8, further comprising:
calculating reachability scores for each remaining node, wherein the reachability score of each respective remaining node is a function of a number of hops to the respective remaining node, the performance metrics of a parent branch of the respective remaining node, and the data state transitions to reach the respective remaining node; and
selecting the node and the machine learning model using the implication tree based upon the reachability score for that respective node.

12. The method according to claim 1, wherein the future possible data state transitions are user supplied.

13. A non-transitory computer readable medium comprising instructions that, when executed by at least one hardware processor, configure the at least one hardware processor to:
provide a machine learning model trained with one or more electronic training data sets, the one or more electronic training data sets comprising a previous electronic training data set;
receive a new electronic data set;
compare the new electronic data set to the previous electronic training data set;
identify a new set of attributes added to the new electronic data set in comparison to the previous electronic training data set;
identify a removed set of attributes deleted from the new electronic data set in comparison to the previous electronic training data set;
identify a changed set of attributes in the new electronic data set that were modified in comparison to the previous electronic training data set;
identifying a significant attribute set, wherein the significant attribute set comprises one or more of the changed set of attributes that contributes to a data state transition in the new electronic data set;
record at least one of an attribute group consisting of: the new set of attributes, the removed set of attributes, the significant set of attributes, and combinations thereof, as data state transitions, including a present data state and all pass-through data state transitions which represent previous data states;
generate future possible data state transitions based upon the present data state;
generate an implication tree based upon the present data state, all the pass-through data state transitions, and future possible data state transitions, wherein the implication tree comprises nodes that represent the future possible data state transitions and each said node further represents a respective machine learning models that corresponds to one or more respective future possible data state transitions; and
select a node and a machine learning model using the implication tree.

14. The non-transitory computer readable medium according to claim 13, further comprising instructions that, when executed by at least one hardware processor, configure the at least one hardware processor to:
calculate performance metrics for each node in the implication tree; and
cluster the performance metrics of each node in the implication tree and disregard the nodes demonstrating a high variance in the performance metrics while using any remaining nodes.

15. The non-transitory computer readable medium according to claim 14, further comprising instructions that, when executed by at least one hardware processor, configure the at least one hardware processor to:
calculate reachability scores for each remaining node, wherein the reachability score of each respective remaining node is a function of a number of hops to the respective remaining node, the performance metrics of a parent branch of the respective remaining node, and the data state transitions to reach the respective remaining node; and
select the node and the machine learning model using the implication tree based upon the reachability score for that respective node.

16. The method according to claim 13, wherein the future possible data state transitions are user supplied.

17. The method according to claim 13, further comprising:
calculating performance metrics for each node in the implication tree;
calculating reachability scores for each node in the implication tree, wherein a reachability score is a function of a number of hops to the respective node, the performance metrics of a parent branch of the respective node, and the data state transitions to reach the respective node; and
selecting the node and the machine learning model using the implication tree based upon the reachability score of the node.

18. A computer-implemented system to capture data transitions in machine learning models comprising:
a memory storage device storing program instructions; and
a hardware processor coupled to said memory storage device, the hardware processor, in response to executing said program instructions, is configured to:
provide a machine learning model trained with one or more electronic training data sets, the one or more electronic training data sets comprising a previous electronic training data set;
receive a new electronic data set;
compare the new electronic data set to the previous electronic training data set;

identify a new set of attributes added to the new electronic data set in comparison to the previous electronic training data set;

identify a removed set of attributes deleted from the new electronic data set in comparison to the previous electronic training data set;

identify a changed set of attributes in the new electronic data set that were modified in comparison to the previous electronic training data set;

record at least one of an attribute group consisting of: the new set of attributes, the removed set of attributes, the changed set of attributes, and combinations thereof, as data state transitions, including a present data state and all pass-through data state transitions which represent previous data states;

generate future possible data stat transitions based upon the present data state;

generate an implication tree based upon the present data state, the pass-through data state transitions, and the future possible data state transitions, wherein the implication comprises nodes that represent future possible data state transitions and each said node further represents a respective machine learning model that corresponds to one or more respective future possible data state transitions; and select a node and the machine learning model using the implication tree.

19. The computer-implemented system according to claim 18, wherein the hardware processor, in response to executing said program instructions, is further configured to:

calculate performance metrics for each node in the implication tree;

cluster performance metrics of each node in the implication tree, and disregard nodes demonstrating a high variance in their performance metrics while using any remaining nodes;

calculate reachability scores for each remaining node, wherein the reachability score of each respective remaining node is a function of a number of hops to the respective remaining node, the performance metrics of a parent branch of the respective remaining node, and a set of data state changes to reach the respective remaining node; and select the node and machine learning model using the implication tree based upon the reachability score.

20. The method according to claim 18, further comprising:

calculating performance metrics for each node in the implication tree;

calculating reachability scores for each node in the implication tree, wherein a reachability score is a function of a number of hops to the respective node, the performance metrics of a parent branch of the respective node, and the set of data state changes to reach the respective node; and selecting the node and the machine learning model using the implication tree based upon the reachability score of the node.

* * * * *